United States Patent [11] 3,622,662

| [72] | Inventors | Francis D. Roberts<br>W. Millington;<br>James Norfleet, Plainfield, both of N.J. |
|---|---|---|
| [21] | Appl. No. | 818,059 |
| [22] | Filed | Apr. 21, 1969 |
| [45] | Patented | Nov. 23, 1971 |
| [73] | Assignee | Colgate-Palmolive Company<br>New York, N.Y. |

[54] STABLE DENTAL CREAM
16 Claims, No Drawings

[52] U.S. Cl. .................................................... 424/54,
424/57, 424/58
[51] Int. Cl. ........................................................ A61r 7/16
[50] Field of Search ............................................ 424/49–58

[56] References Cited
UNITED STATES PATENTS

| 2,024,146 | 12/1935 | Crowther .................... | 424/49 |
|---|---|---|---|
| 3,095,356 | 6/1963 | Moss ............................ | 424/51 |

OTHER REFERENCES

The Dispensatory of the United States of America, 25th ed., published by J. B. Lippincott Co., Phila., 1955, page 159, copy in group 120

*Primary Examiner*—Richard L. Huff
*Attorneys*—Herbert S. Sylvester, Murray M. Grill, Norman Blumenkopf, Ronald S. Cornell, Thomas J. Corum, Richard M. Miller and Robert L. Stone ABSTRACT: Dental cream containing polishing agent, benzyl alcohol and clove or mint flavor. Zinc oxide, zinc phosphate, or alkali metal phosphate having a p$K_a$ of at least 7 in water at 25° C. (such as trisodium phosphate), is present to stabilize and prevent separation of the cream.

STABLE DENTAL CREAM

This invention relates to a dental cream composition. More particularly, it relates to a dental cream which promotes oral hygiene by being easily applied to tender areas of the gums.

In the oral cavity of mammals, the gums are often very tender; and it is difficult or painful to cleanse them properly with a dental cream.

It is therefore, desirable to provide a dental cream containing an agent which has a mild desensitizing effect on the gums, such as benzyl alcohol, to permit facile cleansing of tender areas of the oral cavity. Oil of cloves and mint oils (such as oil of peppermint and oil of spearmint) have been found to be particularly desirable flavors for such a dental cream. However, dental creams containing benzyl alcohol in amounts sufficient to desensitize the gums and such flavors may tend to separate into liquid and solid phases.

It is an object of this invention to provide a dental cream containing benzyl alcohol and a mint or clove flavor which is storage stable.

Other objects will be apparent from consideration of the following disclosure.

In accordance with certain of its aspects, this invention relates to a dental cream comprising a substantially water-insoluble polishing agent, benzyl alcohol, a flavor selected from the group consisting of clove and mint, and a stabilizing component selected from the group consisting of zinc oxide, zinc phosphate, and an alkali metal phosphate having a $pK_a$ of at least 7 in water at 25° C.

The instant compositions normally have a pH between about 3.5 and 10 preferably on the order of about 6–9 and most preferably about 6.5. Suitably a buffering system may be employed to assure maintenance of a pH within the aforesaid range in order to insure against a reduction in activity of the composition which occurs under more alkaline or acidic conditions.

Any suitable substantially water-insoluble polishing agent may be employed in the preparation of dentifrice compositions, such as toothpastes, powders, creams and the like, in large number of such materials known in the art. Representative materials include, for example, dicalcium phosphate, tricalcium phosphate, insoluble sodium metaphosphate, aluminum hydroxide, polymethyl methacrylate magnesium carbonate, calcium carbonate, calcium pyrophosphate, calcium sulfate, bentonite, etc., including suitable mixtures thereof. It is preferred to use the water-insoluble calcium salts such as calcium carbonate. Aluminum hydroxide, or hydrated alumina, may also be used in accordance with certain preferred aspects of the invention.

The polishing agent content is variable but will generally be up to about 75 percent by weight of the total composition, typically about 20–75 percent.

Benzyl alcohol is incorporated into the dental cream to effect mild desensitization of tender membranes in the oral cavity. It is generally employed in amounts of about 0.5–10 percent by weight, preferably about 0.75–5.0 percent, and most preferably about 1.0–2 percent.

When the flavor employed is oil of cloves, the presence of benzyl alcohol even in amounts as low as 0.5 percent by weight of the dental cream, results in separation of the cream into liquid and solid phases. When the flavor employed is a mint flavor, a somewhat greater amount of benzyl alcohol may be present, typically up to about 2 percent by weight, before the cream separates into liquid and solid phases.

In accordance with this invention, it has been found that zinc oxide, zinc phosphate and alkali metal phosphates having a $pK_a$ of at least about 7 in water at 25° C. stabilize the dental cream containing benzyl alcohol and oil of cloves. The stabilizer is generally employed in amounts of about 0.15–2 percent by weight, preferably about 0.5–1 percent. Specific effective stabilizers include zinc oxide, zinc orthophosphate, zinc pyrophosphate, trisodium orthophosphate, disodium acid orthophosphate, tetrasodium pyrophosphate, tripotassium orthophosphate, dipotassium acid orthophosphate, tetrapotassium pyrophosphate, etc. The preferred stabilizers are zinc oxide, zinc phosphate and trisodium orthophosphate.

When the polishing agent employed in the dental cream of the instant invention is hydrated alumina, it is particularly desirable to also include an astringent, such as zinc sulfate, zinc chloride, aluminum chloride and the like, in the cream. Typically, the astringent is present in amount of about 0.25–3 percent by weight, preferably 0.5–1 percent. The astringent may also be employed with polishing agents other than hydrated alumina, such as calcium carbonate.

An agent which has a desensitizing effect on tender areas and membranes of the oral cavity may be present in addition to benzyl alcohol. A typical example of such an agent is Benzocaine, ethyl p-amino benzoate, which may be present in the dental cream in amount of about 0.1–3 percent by weight, preferably 0.15–2 percent.

In the dental cream formulation, liquids and solids are proportioned to form a creamy mass of desired consistency. The creamy mass prepared in accordance with the instant invention is typically incorporated into a collapsible dentifrice tube.

In general, the liquids in the dental cream will comprise chiefly water, glycerine, aqueous solutions of sorbitol, propylene glycol, polyethylene glycol 400, etc., including suitable mixtures thereof. It is advantageous usually to use a mixture of both water and a humectant or binder such as glycerine or sorbitol. The total liquid content will generally be about 20–75 percent by weight of the formulation. It is preferred to use also a gelling agent in dental creams such as the natural and synthetic gums and gumlike materials, e.g., Irish moss, gum tragacanth, sodium carboxymethyl cellulose, polyvinylpyrrolidone, starch, and the like, usually in an amount up to about 10 percent and preferably about 0.1–5 percent of the formulation. When the astringent is employed, the preferred gum is Irish moss.

Organic surface-active agents used in the compositions of the present invention may coact with the antimicrobial agent to achieve increased prophylactic action, assist in achieving thorough and complete dispersion of the instant compositions throughout the oral cavity, and render the instant compostions more cosmetically acceptable. The organic surface active material may be anionic, nonionic, ampholytic, or cationic in nature, and it is preferred to employ as the surface active agent a detersive material which imparts to the composition detersive and foaming properties. Suitable such detergents are water-soluble salts of higher fatty acid monoglyceride monosulfates, such as the sodium salt of the monosulfated monogylceride of hydrogenated coconut oil fatty acids, higher alkyl sulfates, such as sodium lauryl sulfate, alkyl aryl sulfonates, such as sodium dodecyl benzene sulfonate, higher alkyl sulfoacetates, higher fatty acid ester of 1,2 dihydroxy propane sulfonates, and the substantially saturated higher aliphatic acyl amides of lower aliphatic amino carboxylic acid compounds, such as those having 12 to 16 carbons in the fatty acid, alkyl or acyl radicals, and the like. Examples of the last mentioned amides are N-lauroyl sarcosine, and the sodium, potassium, and ethanolamine salts of N-lauroyl, N-myristoyl or N-palmitoyl sarcosinates, which should be substantially free from soap or similar higher fatty acid material which tends to substantially reduce the effect of these compounds. The use of these sarcosinate compounds in dentifrice compositions of the present invention is particularly advantageous since these materials exhibit a prolonged and marked effect in the inhibition of acid in the oral cavity due to carbohydrates, in addition to exerting some reduction in the solubility of tooth enamel in acid solutions.

Other suitable surface active materials include nonionic agents such as condensates of sorbitan monostearate with approximately 60 moles of ethylene oxide, condensates of ethylene oxide with propylene oxide condensates of propylene glycol ("Pluronics") and cationic surface active germicides and antibacterial compounds such as di-isobutylphenoxyethoxyethyl dimethyl benzyl ammonium chloride, benzyl dimethyl stearyl ammonium chloride, tertiary amines having one fatty alkyl group (of from 12 to 18 carbon atoms) and two (polyoxyethylene groups attached to the nitrogen (typically containing a total of from about 2 to 50 ethenoxy groups per molecule) and salts thereof with acids, and compounds of the structure

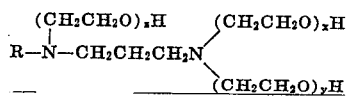

where R is a fatty alkyl group containing from about 12 to 18 carbon atoms, and $x$, $y$ and $z$ total 3 or higher, as well as salts thereof with mineral or organic acids.

It is preferred to use from about 0.05 to 5 percent by weight of the foregoing surface-active materials in the instant dental creams.

Various other materials may be incorporated in the dental creams of this invention. Examples thereof are coloring or whitening agents, preservatives, silicones, chlorophyll compounds, ammoniated materials such as urea, diammoniumphosphate and mixtures thereof, and other constituents. These adjuvants are incorporated in the instant compositions in amounts which do not substantially adversely effect the properties and characteristics suitably selected and used in proper amount depending upon the particular type of preparation involved.

Antibacterial agents may also be employed in the dental creams of the instant invention. Typical antibacterial agents include $N^1$-(4-chlorobenzyl)-$N^5$-(2,4-dichlorobenzyl) biguanide;
p-chlorophenyl biguanide;
4-chlorobenzhydryl biguanide;
4-chlorobenzhydrylguanylurea;
N-3-lauroxypropyl-$N^5$-p-chlorobenzylbiquanide;
1,6-di-p-chlorophenylbiguanidohexane; octane dichloride
1-(lauryldimethylammonium)-8-(p-chlorobenzyl-dimethylammonium) octane dichloride;
5,6-dichloro-2-guanidinobenzimidazole;
$N^1$-p-chlorphenyl-$N^5$-laurylbiguanide;
5-amino-1,3-bis(2-ethylhexyl)-5-methylhexahydro pyrimidine;
and their nontoxic acid addition salts.

The antibacterial agent, when present, is employed in amounts of about 0.01–5 percent by weight, preferably about 0.05–5 percent.

Any suitable flavoring or sweetening sialagogue may be optionally employed in addition to clove or mint oil in formulating the dental cream of the present invention. Examples of suitable additional flavoring constituents include flavoring oils such as wintergreen, sassafras, sage, eucalyptus, marjoram, cinnamon, lemon and orange, as well as sodium methylsalicylate. Suitable sweetening agents include sucrose, lactose, maltose, sorbitol, sodium cyclamate and saccharine. Suitably, the total amount of sialagogue including clove or mint may comprise about 0.5–5 percent or more of the dental cream of the instant invention.

The composition of the present invention suitably may also contain a fluorine-containing compound having a beneficial effect on the care and hygiene of the oral cavity, e.g., diminution of enamel solubility in acid and protection of the teeth against decay. Examples thereof include sodium fluoride stannous fluoride, potassium fluoride, potassium stannous fluoride ($SnF_2 \cdot KF$), sodium hexafluorostannate, stannous chlorafluoride sodium fluorozirconate, and sodium monofluorophosphate. These materials, which dissociate or release fluorine-containing ions in water, suitably may be present in an effective but nontoxic amount, usually within the range of about 0.01 to 1 percent by weight of the water soluble fluorine content thereof.

The following specific examples are further illustrative of the nature of the present invention but it is to be understood that the invention is not limited thereto. All amounts and proportions are by weight unless otherwise indicated.

EXAMPLE 1

The following dental creams are prepared:

|  | A Parts | B Parts | C Parts |
| --- | --- | --- | --- |
| Glycerine | 22.0 | 22.0 | 22.0 |
| Irish Moss | 1.0 | 1.0 | 1.0 |
| Sodium Benzoate | 0.5 | 0.5 | 0.5 |
| Sodium Saccharin | 0.2 | 0.2 | 0.2 |
| Water (distilled) | 17.0 | 19.0 | 17.5 |
| Zinc Sulfate | 0.6 | 0.6 | 0.6 |
| Sodium Lauryl Sulfate | 1.5 | 1.5 | 1.5 |
| Zinc Oxide | 1.0 | 0.5 | 0.5 |
| Hydrated Alumina | 52.0 | 52.0 | 52.0 |
| Benzyl Alcohol | 3.0 | 1.5 | 3.0 |
| Oil of Cloves | 1.2 | 1.2 |  |
| Oil of Peppermint |  |  | 1.2 |

These formulations are prepared by adding the stabilizing component, zinc oxide, to gels containing glycerine, Irish moss, sodium benzoate, sodium saccharine, water, zinc sulfate and sodium lauryl sulfate. The polishing agent (hydrated alumina) is then added to form creams. Benzyl alcohol and flavor oil are next added. The creams maintain a desirable thickness, even after storage for several months.

The creams are easily applied in the oral cavity, even to tender areas of the gums and effectively cleanse the oral cavity, including such tender areas.

Similar desirable dental creams are obtained when the zinc oxide is added to the cream after addition of the polishing agent.

When it is attempted to prepare the same creams, except for the omission of zinc oxide, the creams quickly separate into liquid and solid phases in less than 24 hours.

EXAMPLE 2

The following dental creams are prepared in a manner similar to that described in example 1:

|  | A Parts | B Parts | C Parts |
| --- | --- | --- | --- |
| Glycerine | 22.0 | 22.0 | 22.0 |
| Irish Moss | 1.0 | 1.0 | 1.0 |
| Sodium Benzoate | 0.5 | 0.5 | 0.5 |
| Sodium Saccharine | 0.2 | 0.2 | 0.2 |
| Water | 18.5 | 18.5 | 18.5 |
| Zinc Sulfate | 0.6 | 0.6 |  |
| Sodium Lauryl Sulfate | 1.5 | 1.5 | 1.5 |
| Zinc Orthophosphate |  | 1.0 |  |
| Zinc Oxide | 1.0 |  |  |
| Trisodium Orthophosphate |  |  | 1.0 |
| Calcium Carbonate | 52.0 | 52.0 | 52.0 |
| Benzyl Alcohol | 1.5 | 1.5 | 1.5 |
| Oil of Cloves | 1.2 | 1.2 | 1.2 |

These creams retain desirable thickness for long periods of time while the same creams from which stabilizers are omitted quickly separate into liquid and solid phases within 1 day.

The creams of this example are easily applied in the oral cavity, even to tender areas of the gums and effectively cleanse the oral cavity, including such tender areas.

EXAMPLE 3

The following dental cream is prepared in a manner similar to that described in example 1, the ethyl p-amino benozate being added after the alumina polishing agent:

|  | Parts |
| --- | --- |
| Glycerine | 22.0 |
| Irish Moss | 0.8 |

| | |
|---|---|
| Sodium Benzoate | 0.5 |
| Sodium Saccharine | 0.2 |
| Water | 19.4 |
| Zinc Sulfate | 0.6 |
| Sodium Lauryl Sulfate | 1.5 |
| Zinc Oxide | 0.5 |
| Hydrated Alumina | 52.0 |
| Ethyl p-Amino Benzoate | 0.5 |
| Benzyl Alcohol | 0.8 |
| Oil of Cloves | 1.2 |

This cream retains desirable thickness for a long period of time while the same cream from which zinc oxide is omitted quickly separates into liquid and solid phases.

The cream of this example is easily applied in the oral cavity, even to tender areas of the gums, and effectively cleanses the oral cavity, including such tender areas.

It will be apparent to one skilled in the art that various modifications may be made and that equivalents can be substituted therefor.

We claim:

1. A dental cream comprising a dentally acceptable substantially water-insoluble polishing agent, benzyl alcohol, a flavor including about 0.5–5 percent by weight of a material selected from the group consisting of clove flavor and mint flavor, and 0.5–2 percent by weight of an alkali metal phosphate having a $pK_a$ of at least 7 in water at 25° C. as a stabilizing component; said benzyl alcohol being present in am amount of about 0.5–10 percent by weight when said material is clove flavor and about 2–10 percent by weight when said material is mint flavor.

2. The dental cream of claim 1 wherein said stabilizing component is trisodium orthophosphate.

3. A dental cream comprising a dentally acceptable substantially water-insoluble polishing agent consisting of an agent selected from the group consisting of hydrated alumina, water-insoluble calcium salts and mixtures thereof, benzyl alcohol, a flavor including about 0.5–5 percent by weight of a material selected from the group consisting of clove flavor and mint flavor, and 0.15–2 percent by weight of a stabilizing component selected from the group consisting of zinc oxide, zinc phosphate and an alkali metal phosphate having a $pK_a$ of at least 7 in water at 25° C.; said benzyl alcohol being present in amount of about 0.5–10 percent by weight when said material is clove flavor and about 2–10 percent by weight when said material is mint flavor.

4. The dental cream of claim 3 wherein said substantially water-insoluble polishing agent consists of hydrated alumina.

5. The dental cream of claim 3 wherein said dental cream also contains about 0.1–3 percent by weight of ethyl p-amino benzoate.

6. A process for improving oral hygiene which comprises applying to the oral cavity the dental cream claimed in claim 3.

7. The process for improving oral hygiene of claim 6 wherein said stabilizing component is zinc oxide.

8. The dental cream of claim 3 wherein said flavor is a mint flavor.

9. A dental cream of claim 8 wherein said mint flavor is oil of peppermint and said benzyl alcohol is present in an amount of about 3–10 percent by weight.

10. The dental cream of claim 8 wherein said stabilizer is zinc oxide.

11. The dental cream of claim 3 wherein said flavor is oil of cloves.

12. The dental cream of claim 11 wherein said stabilizing component is zinc oxide.

13. The dental cream of claim 11 wherein said stabilizing component is zinc phosphate.

14. A dental cream comprising polishing agent consisting of hydrated alumina about 0.75 percent by weight of benzyl alcohol, about 0.5–1.2 percent by weight of oil of cloves and about 0.5–1 percent, by weight of zinc oxide.

15. The dental cream of claim 14 wherein said dental cream also contains about 0.25 percent by weight of an astringent.

16. The dental cream of claim 15 wherein said astringent is zinc sulfate.

* * * * *